United States Patent [19]

Johnson et al.

[11] 4,189,084
[45] Feb. 19, 1980

[54] LOW COST ASSEMBLY PROCESSES FOR NON-LINEAR RESISTORS AND CERAMIC CAPACITORS

[75] Inventors: Barry C. Johnson, Tempe; Vincent J. Pellechia, Scottsdale, both of Ariz.

[73] Assignee: Motorola, Inc., Schaumburg, Ill.

[21] Appl. No.: 916,326

[22] Filed: Jun. 15, 1978

[51] Int. Cl.² .............................................. H01B 1/08
[52] U.S. Cl. .................................... 228/123; 29/589; 29/628; 357/10
[58] Field of Search ........................ 338/329; 228/123; 29/612, 619, 621, 589, 590, 628; 357/10

[56] References Cited

U.S. PATENT DOCUMENTS 2,859,394  11/1958  Berman .............................. 228/123
3,820,239  6/1974  Nagata ................................ 29/612

FOREIGN PATENT DOCUMENTS 594561  11/1947  United Kingdom ..................... 228/124

Primary Examiner—Lowell A. Larson
Attorney, Agent, or Firm—Vincent B. Ingrassia

[57] ABSTRACT

A brazing operation, using a silver-copper alloy preform in a temperature range of from 800° C. to 1100° C., is employed to attach either radial or axial conductive leads to ceramic non-linear resistors or capacitors, thereby eliminating the necessity of titanium-silver vacuum deposition or conductive cermet application prior to lead attachment. Glass encapsulation may be accomplished simultaneous with the brazing operation to further reduce cost.

5 Claims, 4 Drawing Figures

LOW COST ASSEMBLY PROCESSES FOR NON-LINEAR RESISTORS AND CERAMIC CAPACITORS

FIELD OF THE INVENTION

The invention relates to a low cost assembly method for ceramic non-linear resistors or capacitors.

BACKGROUND OF THE INVENTION

In prior art methods for assembly of non-linear resistors or capacitors, a vacuum deposited titanium-silver, chromium-silver composite or a conductive-cermet system provides a metal surface on the pellet to which external leads are soldered or epoxy joined. Plastic encapsulation of the subassembly is then obtained by means of a fluidized bed process. The prior art assembly process comprises three independent steps; (1) the metallization step, (2) the soldering or epoxy joining step and (3) the plastic encapsulation step. Since the assembly steps comprise a significant portion of the total costs of these devices, the semiconductor industry is constantly searching for means to reduce the assembly step complexity and, hence, the costs.

SUMMARY OF THE INVENTION

The goal of reducing the assembly costs of non-linear pellet devices is accomplished by combining a brazing and encapsulation step in the assembly process, thereby eliminating the need for vacuum deposition of titanium silver or chromium-silver and separate steps for soldering and encapsulation.

It is, therefore, an object of the invention to replace a metal deposition and a soldering step with a brazing step in a method of assembly of non-linear pellet devices.

It is another object of the invention to combine a brazing and encapsulation step in the assembly of non-linear pellet devices.

These and other objects of the invention will be more readily understood by reading the Detailed Description of the Invention which follows together with the drawings in which:

FIG. 1 illustrates, in cross-section, an assembly made according to the method of the invention, FIGS. 2 and 3 illustrate, in cross-section, other assemblies made in accordance with the method of the invention, and FIG. 4 shows, in cross-section, an assembly made according to the method of the invention, including brazing and glass encapsulation in a single step.

DETAILED DESCRIPTION OF THE INVENTION

Figure 1:
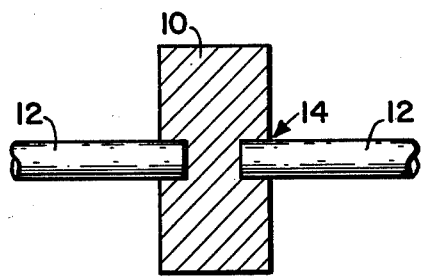

Referring to FIG. 1, ceramic pellet 10 may be shaped to receive conductive lead 12 which is brazed in place using a silver-copper alloy perform (not shown) to provide a mechanical and electrical joint at point 14. Alternatively (see FIG. 2), ceramic pellet 16 may have planar ends 18. Conductive lead 20 may have headed end 22. A silver-copper alloy preform (not shown) may be used to provide a brazed attachment between header 22 and surface 18. Still another alternative configuration is shown in FIG. 3. Pellet 24 is formed with recess 26 therein to receive header 22 of lead 20. A silver-copper alloy preform (not shown) is used to provide a brazed attachment between lead 20 and recess 26.

Figure 2:
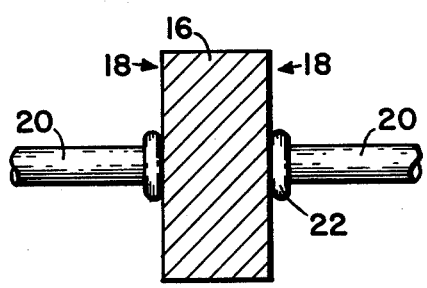
Figure 3:
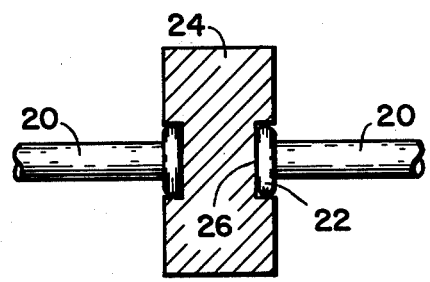

The silver-copper alloy brazing preforms used in the configurations of FIGS. 1, 2 and 3 may comprise silver in the range of from 70 percent to 95 percent by weight and copper in the range of from 30 percent to 5 percent by weight. When metals or alloys such as 52 alloy (52 percent nickel, 48 percent iron by weight) leads are used, a 72 percent silver, 28 percent copper brazing alloy produces good results when heated to 850°C. Other temperatures in the range of from 800° C. to 1100° C. are also useful. This temperature may be applied in a nitrogen environment.

The 72 Ag-28 Cu alloy preform used with 52 alloy leads at 850° C. were used for attachment to a varistor composed of ZnO (82 percent by weight) and $Bi_2O_3$ (15 percent by weight). The varistor dimensions were nominally 0.4–0.5 inches in diameter and 0.04–0.08 inches thick. When the leads were peeled from the varistor surface (after cooling, of course) large portions of the varistor material was left attached to the conductive leads leaving cavity areas in the varistor. The indication is of an excellent diffusion bond.

Figure 4:
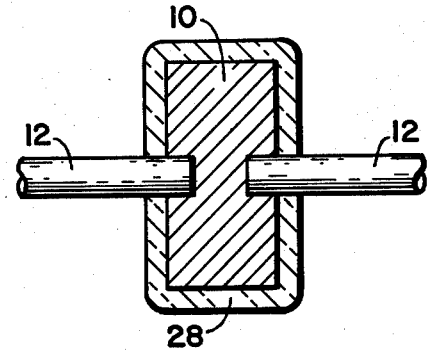

FIG. 4 illustrates another embodiment of the invention in which pellet 10 and leads 12 are encapsulated in glass 28. Glass performs such as Corning 9013 may be used in conjunction with 52 alloy leads and Ag-Cu brazing performs to accomplish successful simultaneous glass encapsulation and brazing in the 800° C. to 1100° C. temperature range. When the configuration of FIG. 4 is cracked open for inspection, it reveals very good glass to metal adhesion as well as good metal to ceramic integrity. This insures a hermetic seal which is superior in terms of quality and reliability to that of prior art plastic (non-hermatic) seals. In all cases, the brazed joints demonstrate good wetting, flow and adhesion.

Various other modifications and changes may be made to the present invention as here disclosed without departing from the spirit and scope thereof as encompassed in the accompanying claims.

We claim:

1. A method of assembling a ceramic non-linear pellet device having conductive leads attached thereto comprising the steps of:
    assembling the ceramic non-linear pellet, the leads and a silver-copper alloy perform at ambient temperature;
    heating said assembly to the range of from 800° C. to 1100° C.; and
    cooling the assembly to allow adherence of the parts of the assembly.

2. The method according to claim 1 wherein said silver-copper alloy preform comprises silver in the range of from 70% to 95% by weight and copper in the range of from 5% to 30% by weight.

3. The method according to claim 1 wherein said silver-copper alloy preform comprises approximately 72 percent silver by weight and approximately 28 percent copper by weight.

4. The method according to claim 1, 2 or 3 wherein the step of assembling further comprises an encapsulation material.

5. The method according to claim 4 wherein the encapsulation material is glass.